United States Patent
Flippen, Jr.

(10) Patent No.: US 7,343,362 B1
(45) Date of Patent: Mar. 11, 2008

(54) LOW COMPLEXITY CLASSIFICATION FROM A SINGLE UNATTENDED GROUND SENSOR NODE

(75) Inventor: Luther D. Flippen, Jr., Waldorf, MD (US)

(73) Assignee: United States of America as represented by the Secretary of the Army, Washington, DC (US)

( * ) Notice: Subject to any disclaimer, the term of this patent is extended or adjusted under 35 U.S.C. 154(b) by 344 days.

(21) Appl. No.: 10/947,126

(22) Filed: Sep. 23, 2004

Related U.S. Application Data

(60) Provisional application No. 60/481,479, filed on Oct. 7, 2003.

(51) Int. Cl.
  *G06E 1/00* (2006.01)
  *G06E 3/00* (2006.01)
  *G06F 15/18* (2006.01)
  *G06G 7/00* (2006.01)

(52) U.S. Cl. ..................................................... 706/20

(58) Field of Classification Search .................. 706/20
  See application file for complete search history.

(56) References Cited

U.S. PATENT DOCUMENTS

| | | | | |
|---|---|---|---|---|
| 4,504,864 | A | * | 3/1985 | Anastassiou et al. ....... 348/619 |
| 4,811,214 | A | * | 3/1989 | Nosenchuck et al. ......... 712/11 |
| 5,005,147 | A | | 4/1991 | Krishen et al. |
| 5,179,714 | A | * | 1/1993 | Graybill ...................... 712/19 |
| 5,299,028 | A | * | 3/1994 | Kwarta ....................... 358/445 |
| 5,392,225 | A | | 2/1995 | Ward |
| 5,532,856 | A | * | 7/1996 | Li et al. ...................... 398/58 |
| 5,590,356 | A | * | 12/1996 | Gilbert ........................ 712/31 |
| 5,745,601 | A | * | 4/1998 | Lee et al. ................... 382/225 |
| 5,752,068 | A | * | 5/1998 | Gilbert ........................ 712/16 |
| 5,867,257 | A | | 2/1999 | Rice et al. |
| 5,978,497 | A | * | 11/1999 | Lee et al. ................... 382/133 |

(Continued)

OTHER PUBLICATIONS

Statistical Edge Detection with Distributed Sensors under the Neynan-Pearson (NP) Optimality Pei-Kai Liao; Min-Kuan Chang; C.-C. Jay Kuo; Vehicular Technology Conference, 2006. VTC 2006-Spring. IEEE 63$^{rd}$ vol. 3, 2006 pp. 1038-1042 Digital Object Identifier 10.1109/VETECS.2006.1682992.*

(Continued)

*Primary Examiner*—Michael B. Holmes
(74) *Attorney, Agent, or Firm*—William W. Randolph; Richard A. Morgan

(57) ABSTRACT

Disclosed are a system and method of multi-modality sensor data classification and fusion comprising partitioning data stored in a read only memory unit on a sensor node using a low query complexity boundary-decision classifier, applying an iterative two-dimensional nearest neighbor classifier to the partitioned data, forming a low query complexity classifier from a combination of the low query complexity boundary-decision classifier and the iterative two-dimensional nearest neighbor classifier, using the low query complexity classifier to identify classification parameters of the sensor node, and monitoring a network of spatially distributed sensor nodes based on the classification parameters of the sensor node. The boundary-decision classifier comprises a single low neuron count hidden layer and a single binary-decision output sensor node, or alternatively, the boundary-decision classifier comprises a linear classifier. Moreover, the network is a wireless unattended ground sensor network, and the data comprises signals transmitted by the sensor node.

25 Claims, 5 Drawing Sheets

U.S. PATENT DOCUMENTS

| | | | | |
|---|---|---|---|---|
| 6,134,354 | A | * | 10/2000 | Lee et al. .................. 382/270 |
| 6,137,899 | A | * | 10/2000 | Lee et al. .................. 382/133 |
| 6,157,749 | A | * | 12/2000 | Miyake ..................... 382/300 |
| 6,570,991 | B1 | * | 5/2003 | Scheirer et al. ............. 381/110 |
| 2002/0184235 | A1 | | 12/2002 | Young et al. |
| 2003/0023534 | A1 | | 1/2003 | Kadambe |
| 2005/0049855 | A1 | * | 3/2005 | Chong-White et al. ..... 704/219 |

OTHER PUBLICATIONS

Li, D. et al., "Detection, Classification and Tracking of Targets," IEEE Signal Processing Magazine, pp. 17-29, Mar. 2002.

Pham, T., et al., "Energy-based Detection and Localization of Stochastic Signals Using an Ad-hoc Sensor Network," Proc. 2002 Meeting of the MSS Specialty Group on Battlefield Acoustic and Seismic Sensing, Magnetic and Electric Field Sensors, Laurel, MD, Sep. 23-26, 2002.

Wang, X., et al., "Collaborative Multi-Modality Target Classification in Distributed Sensor Networks," Proceedings of the Fifth International Conference on Information Fusion, Annapolis, MD, Jul. 8-11, 2002, pp. 285-290.

Damarla, T.R., et al., "Army Acoustic Tracking Algorithm," Proc. 2002 Meeting of the MSS Specialty Group on Battlefield Acoustic and Seismic Sensing, Magnetic and Electric Field Sensors, Laurel, MD, Sep. 23-26, 2002.

Kleinberg, J.M., "Two algorithms for nearest-neighbor search in high dimension," Proc. 29th Annual ACM Symposium Theory Computer, pp. 599-608, 1997.

Chan, T., "Approximate nearest neighbor queries revisited," Proc. 13th International Annual Symposium on Computational Geometry (SCG-97), pp. 352-358, New York, Jun. 4-6, 1997, ACM Press.

Fung, G., et al., "Data Selection for Support Vector Machine Classifiers," Proceedings KDD2000: Knowledge Discovery and Data Mining, Aug. 20-23, 2000, Boston, MA, pp. 64-70, New York, 2000. Asscociation for Computing Machinery.

Jain, A.K., et al., "Statistical Pattern Recognition: A Review," IEEE Transactions on Pattern Analysis and Machine Intelligence, vol. 22, No. 1, pp. 4-37, Jan. 2000.

Monmarche, N., "On Data Clustering with Artificial Ants," Data Mining with Evolutionary Algorithms: Research Directions—Papers from the AAAI Workshop, AAAI Press, Orlando, Florida, pp. 23-26.

* cited by examiner

LOW COMPLEXITY CLASSIFICATION FROM A SINGLE UNATTENDED GROUND SENSOR NODE

BENEFIT CLAIM

This application claims the benefit of U.S. Provisional Application No. 60/481,479, filed Oct. 7, 2003, which is incorporated by reference herein in its entirety.

GOVERNMENT INTEREST

The invention described herein may be manufactured, used, and/or licensed by or for the United States Government.

BACKGROUND OF THE INVENTION

1. Field of the Invention

The invention generally relates to sensor systems, and more particularly to systems and methods of attaining data fusion from a wireless unattended ground sensor network.

2. Description of the Related Art

Within this application several publications are referenced by Arabic numerals within brackets. Full citations for these, and other, publications may be found at the end of the specification immediately preceding the claims. The disclosures of all these publications in their entireties are hereby expressly incorporated by reference into the present application for the purposes of indicating the background of the present invention and illustrating the state of the art.

Monitoring a physical region by spatially distributing sensors within it is a topic of much current interest. This topic encompasses many applications, including that of a wireless unattended ground sensor (UGS) system. Essentially, such a system is a network consisting of spatially distributed nodes each of which typically contains a suite of multiple sensors, at least one digital signal processor (DSP) or central processing unit (CPU), and means for exfiltrating the processed data. Of more particular emphasis are multi-modal sensor suites. Such UGS networks are typically used for target detection, localization/tracking, and classification. Conventionally, the development of the classification for individual sensing modalities, as exemplified, for example, by acoustic modality[1] applications and imaging modality[2] applications has been an ongoing process.

In a wireless UGS system, each node's power source is self-contained, hence, maximizing network lifetime requires that power consumption be minimized. Whatever form of node level classification is used, it must be a low complexity process so that it can be carried out in real time with minimum power consumption (proportional to CPU clock speed) and minimum CPU unit cost. One also needs to limit the peak amount of online random access memory (RAM) storage that is required of a given node. However, minimizing read only memory (ROM) storage of offline, preprocessed data is of lower priority. Limits on node power, processing capability, and communication bandwidth have already motivated the development of low complexity algorithms for target detection and localization[3-5]. The ongoing Basic Orthogonal Sensor System (BOSS) program[4] is also concerned with low complexity classification at the node level.

Performance and energy efficiency of a UGS system is usually enhanced by the use of collaborative signal processing (CSP) at various levels of the network[3]. For low power, low cost UGS networks, target classification should be implemented as intrasensor collaboration[3] in the form of node multi-modal fusion. In fact, conventional work in this area suggests that one of the simplest and most feasible forms of CSP is to combine the information across different sensing modalities at each node[3]. The information, which is to be combined resides at one node, and therefore does not require communication over the network[3]. Assuming that feature level fusion, such as level one fusion, is desired for the sake of accuracy and robustness, carrying it out at the node level greatly reduces the amount of data to be exfiltrated from a given node. The effect of this reduced bandwidth is that one must then classify targets at the node level using high dimensional feature vectors. These large number of features arise from the concatenation of the feature vectors from each of the sensor modalities that are to be fused[3]. Moreover, this feature-level concatenation approach to multi-modal fusion is prudent as it retains the use of the vast expertise gained in feature extraction development for various individual modalities.

It is acknowledged that successful classification is crucially dependent upon appropriate feature selection for the application at hand. In fact, node level classification for low power, low cost UGS networks requires the use of a low complexity classifier which is also capable of accurately distinguishing between (possibly many) classes in a high dimensional feature space.

However, there is a conflict between the requirement of low computational complexity and the need to classify in high dimensional feature spaces. The need for low computational complexity is even more acute if one implements node temporal fusion[6] at the level above multi-modal fusion, that is, before further classification refinement at the node cluster or network level. In such a case, multi-modal-fused classification would be required for each of a sequence of time windows with the resulting sequence of class predictions undergoing some form of information fusion (such as voting) before exfiltrating the result from the node. The most appropriate classifiers for this situation can hence be determined by considering the complexity of various popular classifiers as a function of feature dimension. A very popular classifier which is also considered to be of low query complexity is the Multivariate Gaussian Classifier (MVG) [7], also known as the quadratic classifier. In fact, currently the MVG classifier is a preferred choice for the United States Army Acoustic Tracking algorithm[8], and it is also one of those evaluated by others[3] for application at the node level in UGS (unattended ground sensor) systems.

One possible measure of the online computational complexity of a classifier is the number of floating point operations (flops) that is required to classify a query vector once the classifier itself has already been trained. In this case, the MVG classifier's complexity is $O(Nd^2)$, where $O(Nd^2)$ denotes "of the order of $Nd^2$" asymptotically, where N is the number of classes and d is the dimension of the feature space (varies on a case-by-case basis). Due to this quadratic dependence on d, the MVG classifier is of low complexity for those cases for which d is not too large, but for large values of d it can rapidly become a high complexity classifier. The query complexity of the k-Nearest Neighbor (kNN), Nearest Neighbor (NN), and Parzen-window-based [7] classifiers, such as the Probabilistic Neural Network (PNN)[7], are all $O(n_T d)$, where $n_T$ is the size of the training dataset. This estimate neglects the nonlinear evaluations that are typical in Parzen-window-based classifiers. Although these classifiers are linear in their d dependence, the fact that $n_T$ is typically large usually precludes such classifiers from low query complexity consideration. Some conventional techniques[9, 10] strive to drastically reduce the query complexity of the NN and kNN methods. However, these traditional techniques may encounter difficulties as d increases. Brute force (such as where all data points are considered) NN/kNN is still a preferred technique[9] for most such efforts for $d \geq O(\log n_T)$.

As another classifier example, the query complexity of a nonlinear Support Vector Machine (SVM)[11, 12] is $O(Nn_{SV}d)$, neglecting the nonlinear evaluations, where $n_{SV}$ is the number of support vectors required for the particular application. In contrast to this, the complexity of a linear classifier, including linear SVM classifiers, is only $O(Nd)$. However, a nonlinear SVM classifier cannot compete with an MVG classifier in terms of query complexity alone unless $n_{SV} \leq O(d)$. Furthermore, one can easily find realistic datasets for which $n_{SV}$ is not only appreciably larger than d, but it is even an appreciable fraction of $n_T$[12]. As such, there are efforts to reduce the required number of support vectors [13]. Nevertheless, whether or not a nonlinear SVM is of low complexity appears to be application dependent.

As a final classifier example, the query complexity of a neural networks[7] with only one hidden layer (to minimize complexity) is $O(n_N d)$ for the hidden layer and $O(Nn_N)$ for the output layer, where $n_N$ is the number of neurons in the hidden layer. Hence, such a neural net classifier can readily compete with an MVG classifier in terms of query complexity so long as $n_N(d) \leq O(d)$ at least asymptotically for large values of d, that is, as long as the dependence of $n_N$ on d is sub-linear. The minimum value of $n_N$ for a given application is typically tied to classifier performance issues, whereas the maximum allowable value of $n_N$ can be determined by $n_T \geq 5 n_N$ so as to prevent over fitting[2].

This discussion regarding the d-dependence of the complexity of some existing classifiers begs the question as to whether additional classifiers can be developed which are sub-quadratic overall in their query complexity dependence on d. Increasing the "toolbox" of such sub-quadratic-d-complexity algorithms will be of benefit in at least two ways. It will allow one greater choice as to which such classifier is more appropriate to a particular application. Just as importantly, however, it will also increase the opportunity for building other low complexity classifiers from the fusion of low complexity classifiers already available in the "toolbox".

Therefore, due to the limitations of the conventional systems and methods, there is a need for a novel fusion process for the construction of such new classifiers from existing low complexity boundary-decision classifiers as well as a system for implementing such a process.

SUMMARY OF THE INVENTION

In view of the foregoing, an embodiment of the invention provides a method of multi-modality sensor data classification and fusion, wherein the method comprises partitioning data stored in a read only memory unit on a sensor node using a low query complexity boundary-decision classifier; applying an iterative two-dimensional nearest neighbor classifier to the partitioned data; forming a low query complexity classifier from a combination of the low query complexity boundary-decision classifier and the iterative two-dimensional nearest neighbor classifier; and using the low query complexity classifier to identify classification parameters of the sensor node. The method further comprises monitoring a network of spatially distributed sensor nodes based on the classification parameters of the sensor node. The boundary-decision classifier comprises a single low neuron count hidden layer and a single binary-decision output sensor node, or alternatively, the boundary-decision classifier comprises a linear classifier. Moreover, the network is a wireless unattended ground sensor network, and the data comprises signals transmitted by the sensor node. Furthermore, the classification parameters of the sensor node comprise estimates of a target class for a target located at the sensor node and vector coordinates of the target.

In another embodiment, the invention provides a program storage device implementing the above method. Additionally, the invention provides a system for multi-modality sensor data classification and fusion comprising a low query complexity boundary-decision classifier protocol operable for partitioning data stored in a read only memory unit on a sensor node; an iterative two-dimensional nearest neighbor classifier protocol operable for analyzing the partitioned data; and a low query complexity classifier comprising the combination of the low query complexity boundary-decision classifier and the iterative two-dimensional nearest neighbor classifier, wherein the low query complexity classifier is operable for identifying classification parameters of the sensor node. The system further comprises a monitor operable for monitoring a network of spatially distributed sensor nodes based on the classification parameters of the sensor node.

There are several advantages of the invention. For example, the invention provides low bandwidth exfiltration to the next level for cluster-level or network level classification enhancement. Also, the invention retains use of the vast expertise gained in feature extraction development for certain individual modalities. Additionally, the invention adds to the "toolbox" of conventional classifiers, both for fusion of such classifiers and for greater choice of classifiers to fit to a particular application.

These and other aspects and advantages of the invention will be better appreciated and understood when considered in conjunction with the following description and the accompanying drawings. It should be understood, however, that the following description, while indicating preferred embodiments of the invention and numerous specific details thereof, is given by way of illustration and not of limitation. Many changes and modifications may be made within the scope of the invention without departing from the spirit thereof, and the invention includes all such modifications.

BRIEF DESCRIPTION OF THE DRAWINGS

The invention will be better understood from the following detailed description with reference to the drawings, in which.

DETAILED DESCRIPTION OF PREFERRED EMBODIMENTS OF THE INVENTION

Figure 1:
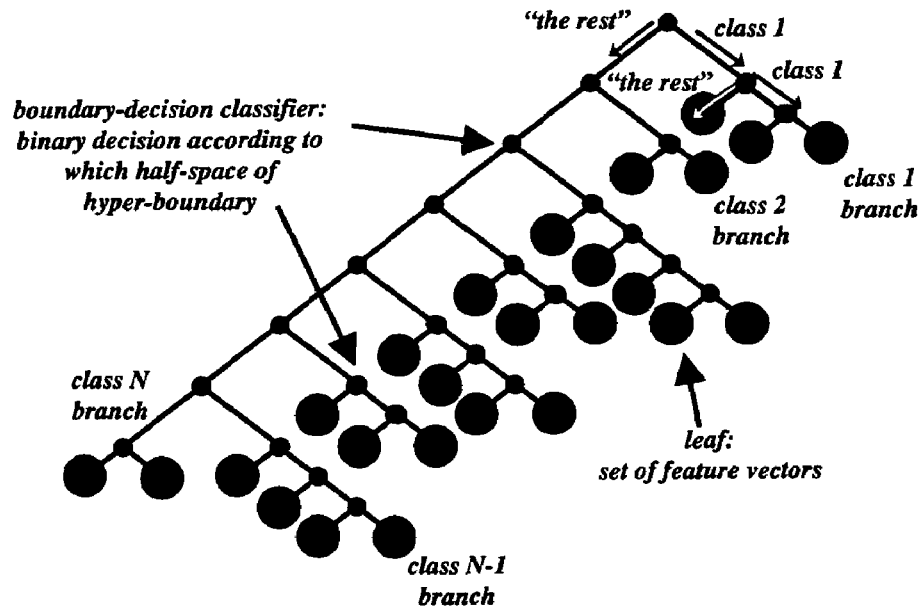
FIG. 1 is a data tree structure diagram according to an embodiment of the invention.

The invention and the various features and advantageous details thereof are explained more fully with reference to the non-limiting embodiments that are illustrated in the accompanying drawings and detailed in the following description. It should be noted that the features illustrated in the drawings are not necessarily drawn to scale. Descriptions of well-known components and processing techniques are omitted so as to not unnecessarily obscure the invention. The examples used herein are intended merely to facilitate an understanding of ways in which the invention may be practiced and to further enable those of skill in the art to practice the invention. Accordingly, the examples should not be construed as limiting the scope of the invention.

The invention provides a fusion process for the construction of new classifiers from existing low complexity boundary-decision classifiers. Generally, the inventive process fuses binary-class boundary-decision classifiers with a novel iterative two-dimensional nearest neighbor classifier. Whether the resulting hybrid classifier possesses overall sub-quadratic-d-complexity is dependent upon the rate of convergence of these iterations towards a fixed point, and upon the complexity of the chosen boundary-decision classifier. Moreover, a fusion methodology is applied to a particular linear classifier and the resulting new hybrid classifier is, in turn, applied to several real world, widely utilized and accepted datasets. Thereafter, this empirical evaluation of its performance versus complexity is benchmarked against that of conventional MVG and NN classifiers. As such, the invention emphasizes, without limitation, classifiers over feature extraction because using feature-level concatenation makes it possible to consider classifier choice/development generically for multiple sensing modalities, whereas feature extraction is well (and/or more easily) developed when oriented towards a particular modality.

Conventionally, boundary-decision classifiers attempt to construct boundaries in the feature space that separate the classes, but these boundaries are usually too crude for such separation in those regions of the feature space for which the classes are well mixed with each other. In order to overcome this problem, the invention uses nearest neighbor classifiers, which are capable of accessing remote locations of these class-mixed regions. However, unless the class-mixed regions contain relatively few feature vectors, nearest neighbor classification is too complex when queried to be used directly in a fused hybrid of the two types of classifiers. The exception to this is when d=2, for which the nearest neighbor (post office) problem has an optimal, very low complexity solution[10] in terms of Voronoi diagrams. Its query complexity is $O(\log n_T)$ as, with the appropriate (training) offline-constructed data structure, it only involves two one-dimensional binary searches. As such, the invention provides a new classifier of low query complexity, which makes iterative use of multiple two-dimensional nearest neighbor data structures to approximately solve the nearest neighbor problem in much larger dimensional feature spaces. By design, the invention trades increased training (offline) complexity and storage for reduced query (online) complexity wherever possible. Moreover, the invention's iterative two-dimensional nearest neighbor classifier is, in turn, fused with a generic boundary-decision classifier, so that one can actually generate fused-hybrid classifiers of various levels of complexity by the particular choice made for the boundary-decision classifier component.

Referring now to the drawings, and more particularly to FIGS. 1 through 8, there are shown preferred embodiments of the invention. The invention's classifier-fusion process occurs in stages. In the first stage, multiple-trained instances of the boundary-decision classifier are used to construct a tree data structure using a "class i versus the rest" strategy as shown in FIG. 1. This divides the training dataset into a hierarchy. Heuristically, the goal is a tree with a branch for each class whose leaves (each a set of vectors) are small in number of members except possibly the branch-end leaf. The branch-end leaf, however, is preferably enriched in vectors of the class associated with that branch. This tree data structure is hence used to first approximately isolate the regions highly enriched in a given class, and then, by pruning away dominant-class feature vectors in the second stage, to isolate class-mixed regions (as pruned tree leaves) to which the iterative two-dimensional nearest neighbor classifier can be applied. This concept is further illustrated in FIG. 2.

Figure 3:
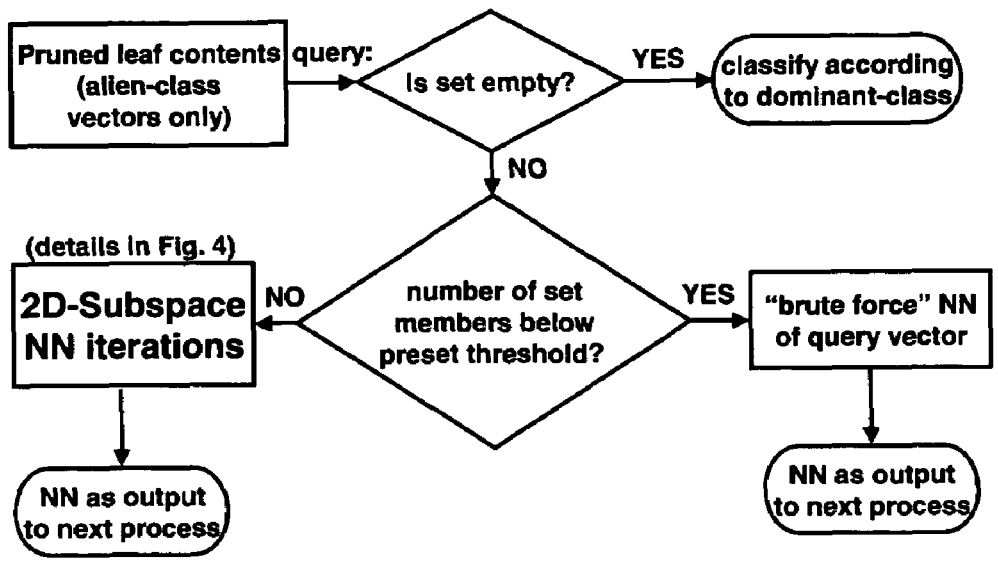
FIG. 3 is a decisional flow diagram according to an embodiment of the invention.
Figure 4:
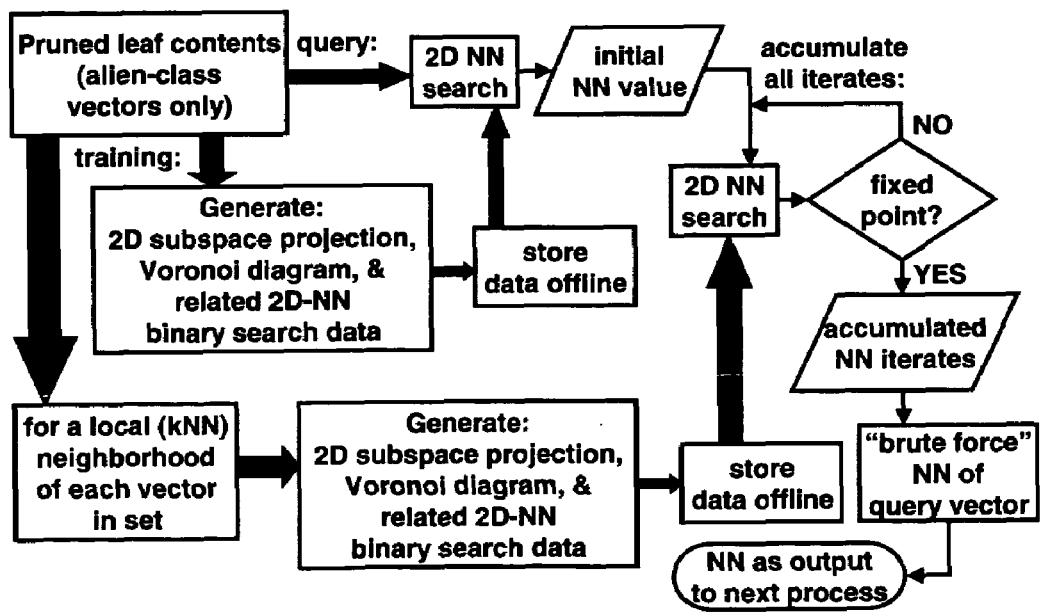
FIG. 4 is a decisional flow diagram according to an embodiment of the invention.

If a particular class-mixed region ("pruned" tree leaf) consists of sufficiently few feature vectors it is more efficient to simply store them for a brute force nearest neighbor search later when queried. For an empty class-mixed region one can classify a query vector parsed to that leaf according to the dominant class for that branch of the tree. This is shown in FIG. 3. The third stage comprises training an instance of the iterative two-dimensional nearest neighbor classifier for each of the isolated class-mixed regions (leaves) of the feature space, as shown in FIG. 4. This classifier fusion process of the invention may be implemented in several formats including Mathematica[14] and Matlab[15].

FIG. 1 illustrates the construction of a binary data tree structure using a given boundary-decision classifier. An instance of the boundary-decision classifier is trained with specific subsets of the training dataset at each bifurcation (decision) point of the tree. The goal is to isolate, as best as possible, each of the various classes of the training dataset to a distinct subregion of the feature space. Parsing the tree via the specifically trained boundary-decision classifiers corresponds to parsing distinct subregions of the feature space (such subregions corresponding to leaves in the tree). As the class-isolation process is usually not perfect, one needs more than just a boundary-decision classifier. Otherwise one could classify new queries using the tree as it is.

Figure 2:
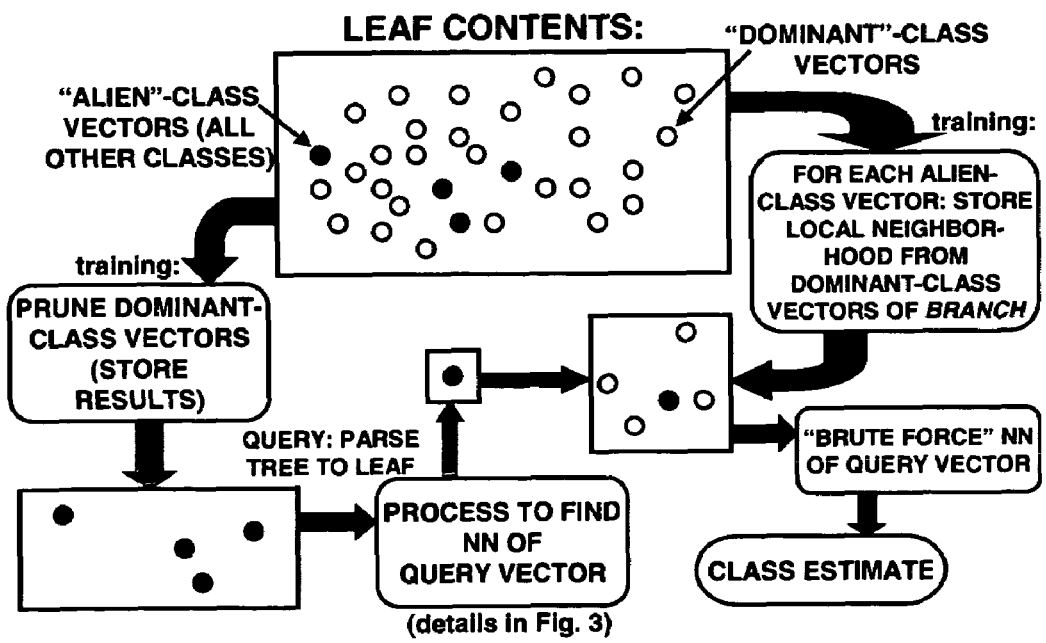
FIG. 2 is a flow diagram illustrating a data tree "leaf" processing diagram according to an embodiment of the invention.

Often, there will be significant numbers of feature vectors from the training dataset that "do not belong" ("alien"-class-associated) in each of the regions dominated by a particular class. These "alien"-class vectors are often well mixed, so that another additional classification strategy is required for them. Assuming that one has parsed the tree to a given leaf during a test query, FIG. 2 illustrates this additional classification strategy in two stages: the first stage is to find the "alien"-class training vector in that leaf which is closest to the query vector (its nearest neighbor). Given this nearest "alien"-class training vector, the second stage is to find the nearest neighbor of the query vector within a neighborhood comprising the "alien"-class training vector itself and those dominant-class training vectors local (nearest) to that "alien"-class training vector. One then classifies the query according to the class of this second-stage nearest neighbor. There are often too many "alien"-class training vectors to perform the first stage computation by "brute force", as this would drive up the computational cost significantly.

FIG. 3 illustrates this first stage at a high level. If there are no "alien"-class training vectors in the leaf, then one can immediately classify a given query according to the dominant class for that leaf. If the number of "alien"-class training vectors in the leaf is small enough, then its first-stage nearest neighbor to the query vector can be computed satisfactorily by "brute force". If, however, as is often the case, the number of "alien"-class training vectors in the leaf is not small, then an iterative-2D-nearest-neighbor method is invoked to find the first-stage nearest neighbor. According to the invention, this iterative-2D-nearest-neighbor method is a generic method in its own right for efficiently finding nearest neighbors to a given query vector from among a pre-determined set.

As FIG. 4 illustrates, the novel iterative-2D-nearest-neighbor method solves the difficult and computationally expensive d-dimensional nearest neighbor problem by making use of a known (optimal and highly efficient) two-dimensional (2D) nearest neighbor method on a sequence of overlapping subsets in the course of a fixed-point, iterative procedure. The feature space dimension d, that is, the number of features, is typically much greater than 2 in the applications for which the invention is preferably intended. As such, the 2D-nearest-neighbor method is a well-known method and is used for 2D cases, whereas the iterative-2D-nearest-neighbor method is unique, and according to the invention can be used for general dD cases. These methods, as described above are distinguished from one another. FIG. 4 describes only one particular variant of the iterative-2D-nearest-neighbor concept, and is not to be construed as limiting the scope of the invention's iterative-2D-nearest-neighbor method.

In order to maintain low query complexity in the resulting fused classifier, the chosen boundary-decision classifier is preferably of low query complexity. There are a number of ultra low complexity classifiers available, as the following two examples demonstrate. The first example involves simple neural nets, comprising a single low-neuron-count hidden layer and a single binary-decision output node, which are linear (and hence sub-quadratic) in their complexity dependence on d. The second example of such a classifier with a single neuron involves a linear classifier. Other examples also exist[2]. On their own, they are good for those applications in which the classes are separable by hyperplanes in the feature space. The boundary-decision classifier provided by the invention uses a linear Lagrangian SVM (LSVM) method[12]. In the more general context of neural nets, the invention represents a modular approach.

The classifier fusion methodology of the invention may also be articulated as a mathematical description. Essentially, the methodology has four parameters: positive-integer-values $\beta$, $\tau$, and W and real-number-values $\eta$ which is restricted to the range $0<\eta \leq 1$. The set function size (V) maps V into its cardinal number, that is, the number of elements in V. Let $X \subset \Re^d$ be the training dataset of feature vectors, so that $n_T = \text{size}(X)$, and let $C_i = \{x \in \text{class } i | x \in X\}$ for $i=1, \ldots, N$ such that X is the disjoint union of all of the $C_i$'s. Some other preliminary parameters are also instructive:

(i) Define $h_i[V]$ for $1 \leq i \leq N$ as the instance of the boundary-decision classifier h which has been trained using the training set $V \subseteq X$ such that, for a given query vector $x \in \Re^d$:

(a) $h_i[V](x) > 0$ classifies x as $x \in \{\text{class } i\}$ and (b) $h_i[V](x) < 0$ classifies x as $x \notin \{\text{class } i\}$.

(ii) Define NN(r, x, V) as the r nearest neighbors of x in V for either $V \subseteq X$ or $V \subset \Re^2$. The actual output of NN is taken to be (a set of) r indices, which point to those elements of V that are the r-nearest neighbors of x.

(iii) Define PO2D[V] as the data structure containing the Voronoi diagram of $V \subset \Re^2$ and related 2D-NN binary search data such that, for $x \in \Re^2$, NN2D(PO2D[V], x)=NN(1, x, V) is computed in O(log size(V)) flops. The "PO" of PO2D stands for "Post Office" problem, which is well-known to those skilled in the art.

In other words, the above definitions can be further described as: (i) is a mathematical representation of a generic boundary-decision classifier; (ii) is a mathematical representation of a "brute force" nearest neighbor method; and (iii) is a mathematical representation of the 2D-nearest-neighbor data structure used to efficiently solve the two-dimensional nearest neighbor problem. Moreover, the 2D-nearest neighbor problem is analogous to the planar point location problem for a Voronoi diagram. According to the invention, the 2D-nearest-neighbor data structure is used iteratively in the mathematical description of the new iterative-2D-nearest-neighbor method for solving nearest neighbor searches of higher dimensions.

A data tree with leaves $S_{i,j}$ for $i=1, \ldots, N$ and $j=1, \ldots, J[i]$ is first constructed as follows.

(1) For $Z_0 = X$, construct $Z_i$ recursively for $i=1, \ldots, (N-1)$ as:
  a. $Z_i = \{h_i[Z_{i-1}](z) \leq 0 | z \in Z_{i-1}\}$
  b. $S_{i,0} = \{h_i[Z_{i-1}](z) > 0 | z \in Z_{i-1}\}$ (2) Take $S_{N,0} = Z_{N-1}$.

(3) For $i=1, \ldots, N$:
  a. Take $Y_{i,0} = S_{i,0}$ and for $=1$,
  i. $Y_{i,j} = \{h_i[Y_{i,j-1}](z) > 0 | z \in Y_{i,j-1}\}$ and
  ii. $\lambda_{i,j} \{h_i[Y_{i,j-1}](z) \leq 0 | z \in Y_{i,j-1}\}$, where the terminating conditions are:
  iii. If $\lambda_{i,J[i]} = \emptyset$, then $S_{i,j} = \lambda_{i,j}$ for $j=1, \ldots, (J[i]-1)$ and $S_{i,J[i]} = Y_{i,J[i]-1}$.
  iv. If $Y_{i,J[i]} = \emptyset$, then $S_{i,j} = \lambda_{i,j}$ for $j=1, \ldots, J[i]$.

(4) Store (for parsing the tree to a particular leaf during a query):
  a. $h_i[Z_{i-1}]$ for $i=1, \ldots, (N-1)$,
  b. for $i=1, \ldots, N$: store $h_i[Y_{i,j-1}]$ for $j=1, \ldots, (J[i]-1)$ and store J[i].

The above steps describe, in mathematically precise terms, is one possible way of constructing the binary data tree previously described in the accompanying FIG. 1 and its description.

Moreover, $Y_{i,j-1} = Y_{i,j} \cap \lambda_{i,j}$ and $Y_{i,j} \cup \lambda_{i,j} = \emptyset$, thus one can show (by induction) that $S_{i,0}$ is the disjoint union of $S_{i,j}$ for $j=1, \ldots, J[i]$. With the data tree now constructed, each leaf of the tree is "pruned" as follows.

(1) For $i=1, \ldots, N$, define:
  a. $\phi_i = C_i \cup S_{i,0}$ and
  b. $\sigma_{i,j} = S_{i,j} - \phi_i$ for $j=1, \ldots, J[i]$.

(2) Define an ordering of the finite number of elements of each $\sigma_{i,j}$ as
  a. $\sigma_{i,j} = \{\sigma_{i,j,1}, \ldots, \sigma_{i,j,k}, \ldots, \sigma_{i,j,M[i,j]}\}$ for $i=1, \ldots, N$ and $j=1, \ldots, J[i]$,
  b. where $M[i,j] = \text{size}(\sigma_{i,j})$ and the $\sigma_{i,j,k}$'s are all distinct for fixed i, j.

(3) For $i=1, \ldots, N$, $j=1, \ldots, J[i]$, and $k=1, \ldots, M[i,j]$ store:
  a. $\Omega_{i,j,k} = \text{NN}(\beta, \sigma_{i,j,k}, \phi_i) \cap \{\text{pointer to } \sigma_{i,j,k}\}$.

The above steps describe, in mathematically precise terms, how the training dataset vectors in each leaf of the tree are distinguished as being either of the "alien" or dominant class for that leaf, as well as how such vectors are mathematically labeled for the purposes of describing the inventive method in subsequent steps. This distinction between "alien" and dominant class is described above in the accompanying FIG. 2 and its description.

The "pruned" leaves are now given by the $\sigma_{i,j}$'s. The last stage of "training" for the invention's methodology comprises training an instance of the iterative two-dimensional nearest neighbor classifier for each leaf of sufficient size. As such, the following parameters hold true. Define the function H as a mapping from real numbers into integers such that H(r) is the smallest integer, which is greater than r.

(1) For i=1, ..., N and j=1, ..., J[i] take $\Psi_{i\,j\,0}\sigma^{i\,j}$ and:
  a. for k=1, ..., M[i, j] define $\Psi_{i\,j\,k}$=X[NN(H($\eta$M[i, j]), $\sigma_{i\,j\,k}$, $\sigma_{i\,j}$)], where X[NN(H($\eta$M[i, j]), $\sigma_{i\,j\,k}$, $\sigma_{i\,j}$)] denotes the subset of X that the pointer output of NN is "pointing at", and
  b. for k=0, 1, ..., M[i, j] determine a linear mapping $T_{i\,j\,k}$ from $\Re^d$ to $\Re^2$ (and complementary reverse mapping $(T_{i\,j\,k})^{1}$ from $\Re^2$ to $\Re^d$) such that $P_{i\,j\,k}=(T_{i\,j\,k})^{T}T_{i\,j\,k}$ has the properties:
    i. $(P_{i\,j\,k})^2=P_{i\,j\,k}$, so that $P_{i\,j\,k}$ projects onto a subspace of $\Re^d$, and that
    ii. $[I-P_{i\,j\,k}](\Psi_{i\,j\,k})$ is "minimized" in some sense.
    iii. Principal Component Analysis (PCA) and Singular Value Decomposition (SVD) are two common means of generating such mappings, where the subspace projections associated with the two largest eigenvalues/singular-values are used.

(2) For i=1, ..., N and j=1, ..., J[i] store M[i, j] and:
  a. If M[i, j]>$\tau$ store $T_{ij\,k}$ and $\Sigma_{i\,j\,k}$=PO2D[$T_{i\,j\,k}(\Psi_{i\,j\,k})$] for k=0, 1, ..., M[i, j].
  b. Else if 0<M[i, j]$\leq\tau$ store $\sigma_{i\,j}$.
  c. Else if M[i, j]=0 store a flag that $\sigma_{i\,j}=\emptyset$.

The above steps describe, in mathematically precise terms, how the training dataset vectors in each leaf of the tree can be preprocessed and stored in a data structure for the efficient processing of future queries, such processes having been previously described in the accompanying FIGS. 2-4 and their descriptions. In particular, the iterative-2D-nearest-neighbor method requires the use of a method for reducing vectors of d-dimension to two dimensions, d>2. It is pointed out that Principal Component Analysis (PCA) and Singular Value Decomposition (SVD) are two common means of performing such dimensional reduction, but they are not the only ones. The above steps can be implemented as part of a computer program.

"Training" of the methodology is complete upon completion of the above iterative steps. Moreover, it is noteworthy that $\sigma_{i\,j\,k}\in\Psi_{i\,j\,k}$. This shows that the mathematical prescription as given above is self-consistent in the sense that each neighborhood $\Psi_{i\,j\,k}$ used in the iterative-2D-nearest-neighbor method does indeed include the training vector $\sigma_{i\,j\,k}$ from which each such neighborhood was generated. The $T_{i\,j\,k}$'s that were actually implemented in software code for evaluation purposes were determined by either an SVD or a PCA, depending upon which gave the smallest error, except when k=0 and the leaf size was greater than 50, in which case PCA was used. With regard to the design choice of selecting "SVD" or "PCA", there are several tradeoffs between the two; one being that SVD is more computationally expensive as the size of the dataset to which it is applied grows. This is not the case for PCA, but PCA only accounts for second order statistics.

The query portion of the methodology may be mathematically represented as follows: Given a query feature vector $x\in\Re^d$:

(1) Take i=
  a. the smallest value of r such that $h_r[Z_{r-1}](x)>0$ for $1\leq r\leq(N-1)$,
  b. else N.

(2) Once i is determined, take j=
  a. the smallest value of r such that $h_i[Y_{i,\,r-1}](x)\leq 0$ for $1\leq r\leq(J[i]-1)$,
  b. else J[i].

(3) If M[i, j]=0 (a stored flag shows that $\sigma_{i\,j}=\emptyset$), then the class of x is taken to be i.

(4) Else if 0<M[i, j]$\leq\tau$, then:
  a. determine r by NN(1, x, $\sigma_{i\,j}$)=(pointer to $\sigma_{i\,j\,r}$), then
  b. determine y from y=NN(1, x, X[$\Omega_{i\,j\,r}$]), and then
  c. the class of x is taken to be that of the element of X to which y is pointing.

(5) Else if M[i, j]>$\tau$, then:
  a. Obtain the sequence m[q] for q=0, 1, ..., qmax by iterating
    i. NN2D($\Sigma_{i\,j\,m[q-1]}$, $T_{i\,j\,m[q-1]}(x)$)=(pointer to $\sigma_{i\,j\,m[q]}$)
    ii. to obtain m[q] from m[q-1] until either convergence to a fixed point or the maximum number of iterations W occurs,
    iii. where the initial term m[0] in the sequence is obtained from
      1. NN2D($\Sigma_{i\,j\,0}$, $T_{i\,j\,0}(x)$)=(pointer to $\sigma_{i\,j\,m[0]}$).
  b. Determine r by NN(1, x, $\{\sigma_{i\,j\,m[0]}, \ldots, \sigma_{i\,j\,m[q]}, \sigma_{i\,j\,m[qmax]}\}$)=(pointer to $\sigma_{i\,j\,r}$), then
  c. determine y from y=NN(1, x, X[$\Omega_{i\,j\,r}$]), and then
  d. the class of x is taken to be that of the element of X to which y is pointing.

The above steps describe, in mathematically precise terms, one possible query process for the invention (as also described earlier in the explanation of FIGS. 1-4). Steps 1 and 2 describe the parsing of the data tree for a given query so that a particular leaf of the data tree is singled out for that query. Step 3 classifies the query as that of the dominant class of the leaf if there are no "alien"-class training vectors in that leaf. If the number of "alien"-class training vectors in the leaf is below a preset threshold value then the query is classified according to step 4. Step 4(a) uses a "brute force" approach to the (first-stage) nearest neighbor search of the "alien"-class training vectors and then performs the second-stage nearest neighbor search according to steps 4(b) and 4(c). The terms "first-stage" and "second-stage" refer to the explanation of FIG. 2 previously given. If the number of "alien"-class training vectors in the leaf is above the preset threshold value then the query is classified according to step 5. Steps 5(a) and 5(b) describe one possible version of the new iterative-2D-nearest-neighbor method to find the (first-stage) nearest neighbor of the query from among the "alien"-class training vectors. The second-stage nearest neighbor search then proceeds according to steps 5(c) and 5(d).

According to the invention, the novel classifier is derived by applying the new classifier-fusion process to a conventional linear classifier[12] so that empirical studies can be performed. A preliminary empirical determination of the performance versus complexity relationship for this specific classifier is made using the classifier parameter values $\beta=7$, $\eta=0.25$, $\tau=10$, and W=10, all being arbitrarily chosen. All of the results are benchmarked against both a conventional MVG classifier and a conventional NN classifier. A query total flop count is maintained in the code implementation of the invention's classifier so that an average flop count per classification can be obtained for the test set used for each dataset. This flop count is all-inclusive, as it also includes the Voronoi-based two-dimensional nearest neighbor binary searches required for each iteration of the classifier. Complexity is measured for all three classifiers in terms of equivalent Euclidean metric evaluations, which is essentially (flops per classification)/3d since a Euclidean metric evaluation requires 3d flops.

In terms of equivalent Euclidean metric evaluations, the conventional MVG and NN classifiers have complexities of $[(2d/3)+1]N$ and $n_T$, respectively, neglecting distance comparison flops and other such overhead. As previously stated, the complexity for the process provided by the invention given in the results is empirically determined by actual flop counts. However, one can estimate the complexity (in equivalent Euclidean metric evaluations) for the invention's classifier-fusion process as $O(\alpha+\beta)$, where $\alpha$ is the sum of (1) the average number of boundary-decision classifier evaluations required to parse the data tree times its complexity-per-classification and the average complexity from: (2) a "brute force" NN search for leaves below the r threshold, and from (3) the iterative two-dimensional nearest neighbor classifier for leaves above the r threshold. Bounds on the first two parts of a can typically be determined (after training) by the data tree's size and by r, but the iterative-2D-NN-dependent component is determined by the average number of iterations required for convergence, which is limited in actual coding by the maximum-allowed value of W. The query complexity for the classifier-fusion methodology provided by the invention is, hence, dependent upon both the boundary-decision classifier component's query complexity and the average number of iterations required for convergence by the iterative-2D-NN classifier component of the fused hybrid.

In other words, in order to code a specific version of the invention for empirical testing and evaluation, a specific concrete choice had to be made for the boundary-decision classifier to be used. The simplest, least-accurate possible such choice (linear) was made so as yield the minimum performance in the invention with respect to such choices. Specific parameter value choices were also required for the invention, such as the threshold value to use for deciding between the use of "brute force" nearest neighbor and the iterative-2D-nearest-neighbor method. "Guessed", non-optimized values were used, which again should lead to sub-optimal performance of the invention. This gives a very conservative evaluation of the invention. The MVG and NN classifiers were chosen as benchmarks in the empirical comparisons as they are widely known and widely utilized amongst those skilled in the art. Floating point counts were maintained for the specific-all coded version of the invention, the MVG, and the NN methods during their class prediction computations. This was done so that a comparison could be made between them as to how much computational effort each required to predict the class of a given query, on average. For the applications for which the invention was originally targeted, minimal computational cost per class prediction is at a premium. The computational costs for classifiers are more often measured in terms of metric evaluations required per classification. Assuming a Euclidean metric, one can convert floating point counts to metric evaluations by dividing the floating point operation count by 3d, d being the number of features for the given dataset.

The empirical classifier evaluation of the invention utilizes the following datasets, all of which can be obtained from the UCI Machine Learning Repository[16]: (1) Iris dataset: This four-dimensional dataset consists of three different classes of iris: Iris Setosa, Iris Versicolor, and Iris Virginica. One class is linearly separable from the others, but the others are not linearly separable from each other. This well-known dataset is used extensively[17]; (2) Ionosphere dataset: This dataset is used for the classification of radar returns from the ionosphere. The radar returns are classified as either "good" or "bad" using 34 features. The targets are free electrons in the ionosphere, whereby "good" radar returns are those showing evidence of some type of structure in the ionosphere, and "bad" returns are those that do not; their signals pass through the ionosphere. The source of this dataset is the Johns Hopkins Applied Physics Laboratory, which has been conventionally used for classifier evaluation [12]; (3) Sonar dataset: This dataset is used to distinguish rocks from mines using sonar signals. There are 60 features for which each number represents the energy within a particular frequency band, integrated over a certain period of time. The "aspect-angle dependent" series is used in this evaluation for which the training and testing sets are carefully controlled to ensure that each set contained cases from each aspect angle in appropriate proportions; (4) Optdigits dataset: This dataset is used for the optical recognition of handwritten digits, with 64 features being derived from bitmaps of such digits from a preprinted form. There is one class per digit for a total of 10 classes; (5) Multiple Features dataset: This dataset also consists of features of handwritten digits. In this case they are extracted from a collection of Dutch utility maps and digitized into binary images. There is one class per digit for a total of 10 classes. The evaluation of an extensive set of classifiers against this dataset has been previously determined[17]. This dataset is actually a collection of six datasets each of which utilize different features for the same set of raw data. Four of these are chosen for the evaluation according to the invention. They include: (i) 76 Fourier coefficients of the character shapes (referred to as "fourier"); (ii) 64 Karhunen-Loeve coefficients (referred to as "karhunen"); (iii) 47 Zernike moments (referred to as "zernike"); and (iv) 6 morphological features (referred to as "morph").

These datasets are respected among researchers as being realistic tests of classifiers. There are many more than those listed above. However, the ones listed were chosen for, among other things, their large number of features (with the exception of the iris dataset, an old "traditional" one). It was also desired that at least some of the datasets have a large number of classes. Although it is general purpose, the invention places a premium on the ability to classify datasets of large dimension (number of features) with minimal computational cost. It is desired that this ability not be degraded significantly for the case in which there are also a large number of classes.

Performance and complexity results for the above datasets are summarized in Table 1 below for queries on the test subsets and in Table 2 for queries on the training subsets. The training and test sets are constructed (or pre-determined) as per the recommendations of the documentation that accompanied each dataset, or as indicated by references that used it.

TABLE 1

Performance and Complexity Results for Test Sets

| Dataset | test size | # of classes | # of features | Percentage correctly classified | | | Average number of Euclidean metric evaluations per classification | | |
|---|---|---|---|---|---|---|---|---|---|
| | | | | New | MVG | NN | New | MVG | NN |
| Iris | 90 | 3 | 4 | 97.8 | 97.8 | 93.3 | 4.1 | 11.0 | 60.0 |
| Ionosphere | 151 | 2 | 34 | 90.1 | 86.8 | 92.1 | 14.3 | 47.3 | 200.0 |
| Sonar | 104 | 2 | 60 | 87.5 | 71.2 | 91.3 | 16.9 | 82.0 | 104.0 |
| Optdigits | 1797 | 10 | 64 | 89.8 | 94.5 | 75.7 | 9.4 | 436.7 | 1914.0 |
| Fourier | 1500 | 10 | 76 | 72.9 | 71.2 | 82.3 | 25.3 | 516.7 | 500.0 |
| Karhunen | 1500 | 10 | 64 | 90.4 | 87.5 | 95.7 | 4.5 | 436.7 | 500.0 |
| Zernike | 1500 | 10 | 47 | 76.5 | 51.8 | 79.1 | 7.4 | 323.3 | 500.0 |
| Morph | 1500 | 10 | 6 | 48.1 | 66.4 | 42.7 | 13.7 | 50.0 | 500.0 |

TABLE 2

Performance and Complexity Results for Training Sets

| Dataset | training size | # of classes | # of features | Percentage correctly classified | | | Average number of Euclidean metric evaluations per classification | | |
|---|---|---|---|---|---|---|---|---|---|
| | | | | New | MVG | NN | New | MVG | NN |
| Iris | 60 | 3 | 4 | 100.0 | 100.0 | 100.0 | 4.0 | 11.0 | 60.0 |
| Ionosphere | 200 | 2 | 34 | 90.5 | 96.5 | 100.0 | 13.1 | 47.3 | 200.0 |
| Sonar | 104 | 2 | 60 | 97.1 | 100.0 | 100.0 | 14.8 | 82.0 | 104.0 |
| Optdigits | 1914 | 10 | 64 | 97.5 | 99.6 | 100.0 | 9.1 | 436.7 | 1914.0 |
| Fourier | 500 | 10 | 76 | 99.8 | 99.6 | 100.0 | 13.5 | 516.7 | 500.0 |
| Karhunen | 500 | 10 | 64 | 100.0 | 100.0 | 100.0 | 4.8 | 436.7 | 500.0 |
| Zernike | 500 | 10 | 47 | 99.8 | 98.6 | 100.0 | 6.7 | 323.3 | 500.0 |
| Morph | 500 | 10 | 6 | 98.6 | 69.8 | 98.6 | 13.7 | 50.0 | 500.0 |

The (uncompressed) storage size of the (non-optimized) data structure generated by training the classifier of the invention for each dataset is as follows: iris 0.0027, ionosphere 0.103, sonar 0.09, optdigits 1.08, fourier 20.5, karhunen 0.28, zernike 0.26, and morph 6.1 (units of Mb). In the case of the "fourier" and "morph" datasets, a few excessively large (pruned) leaves of the data tree generated during training dominated the required storage. This is due to the large number of two-dimensional Voronoi diagrams subsequently generated by such leaves in the training process. This problem may be alleviated for those cases in which it arises, perhaps using a k-means[18] clustering method to break up excessively large pruned leaves. A more elegant possible solution both to this problem, and for the case of very large training datasets, is to apply the invention's process recursively. For pruned leaves in the data tree that are excessively large, one would apply the entire process again (instead of applying two-dimensional NN iterations) on that leaf, perhaps with a permuted class ordering, continuing this process to as many levels as necessary. One would finally use two-dimensional NN iterations wherever necessary only at the lowest level of recursion. A final alternative solution to the problem is simply to use a different (nonlinear) boundary-decision classifier for the fusion process, perhaps one of somewhat higher complexity.

With regard to Tables 1-2, the test size column denotes the number of query vectors to which each method was subjected for that dataset. The "percent correctly classified" columns measure performance of each method for a given dataset (row), the closer to 100%, the better the performance. The method labeled "New" is that corresponding to the invention. The "average number of Euclidean metric evaluations per classification" columns measure the computational cost each method incurred per classification, the lower the number the better. Both evaluation criterion are important. In Table 1, test sets were used each of which was distinct and separate from the corresponding training set. In Table 2, the training set was used as the test set.

Figure 5:
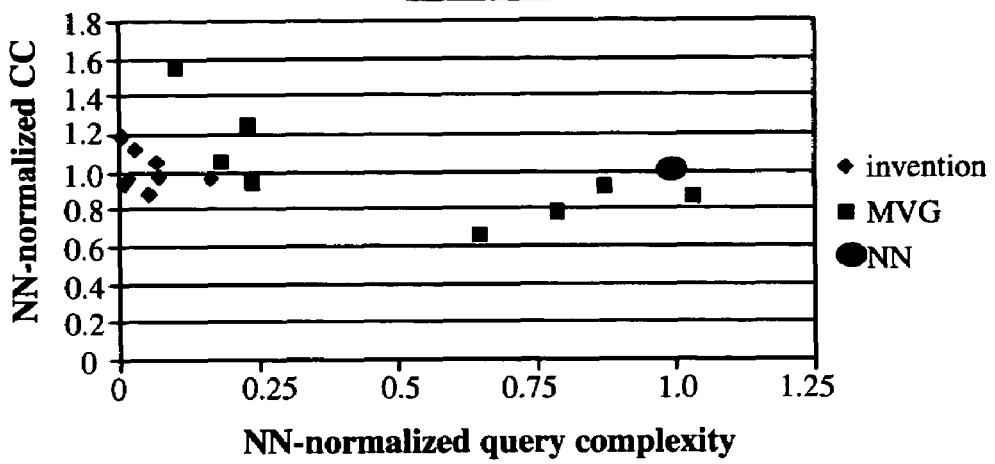
FIG. 5 is a graphical illustration of experimental results achieved according to an embodiment of the invention.

FIG. 5 provides an illustration of the performance versus query-complexity behavior of the invention's classifier to the conventional (MVG) classifier. Specifically, FIG. 5 is a graphical summary of the key results listed in Table 1, whereby the vertical axis values are the percent correctly classified values for the new and MVG classifiers (from Table 1) normalized by the corresponding NN value. Similarly, the horizontal axis values of FIG. 5 are the number of Euclidean metric evaluations per classification values for the new and MVG classifiers (from Table 1) normalized by the corresponding NN value. Thus, there are eight points plotted, one for each dataset, for each of the new and MVG classifiers. The NN classifier is represented by the single point (1, 1) for all of the datasets.

The plotted values for the new classifier are all clustered near the point (0, 1), signifying approximately NN performance at a small percentage of the effort required for NN. As illustrated, there is much more scatter in the MVG points. This is most likely due to the larger values of d and N for many of the datasets and the consequences of such values with regard to MVG query complexity.

In Table 1 the "percent correctly classified" columns for "New" and "MVG" are divided by the corresponding values from the "NN" column for each dataset (row) to give the vertical-axis values for plotting on FIG. 5. Classification performance was normalized to the NN results so as to mitigate the effect of variation in inherent classification "difficulty" from dataset to dataset (as could be quantitatively measured using the Bayes error for that dataset). Similarly, the "average number of Euclidean metric evaluations per classification" columns for "New" and "MVG" are divided by the corresponding values from the "NN" column for each dataset (row) to give the horizontal-axis values for plotting on FIG. 5. Again, the method labeled "New" is that corresponding to the invention. This means that there is one (filled triangle) point in FIG. 5 for each dataset for "New" (invention), one (filled square) point for each dataset for "MVG", and a single (large) point at (1, 1) on the graph for "NN". The points attributed to the invention tend to cluster in the vicinity of (0, 1), which signifies that the invention achieves performance (vertical component) comparable to (sometimes better than) "NN", but at only a very small fraction of the computational cost per classification (horizontal component). The points for "MVG" are more scattered, but similar conclusions can be drawn overall: The invention achieves performance comparable to "MVG", but typically at only a fraction of the computational cost per classification.

The results presented above are empirical evidence that the iterations of the invention's classifier process converge sufficiently rapidly, which is indicative of low query complexity for the invention. This is accomplished without sacrificing performance, as benchmarked against the conventional MVG and NN classifiers. Furthermore, these results support the assertion that quality multi-modality classification is feasible at the node level for low cost, low power UGS systems.

Figure 6:
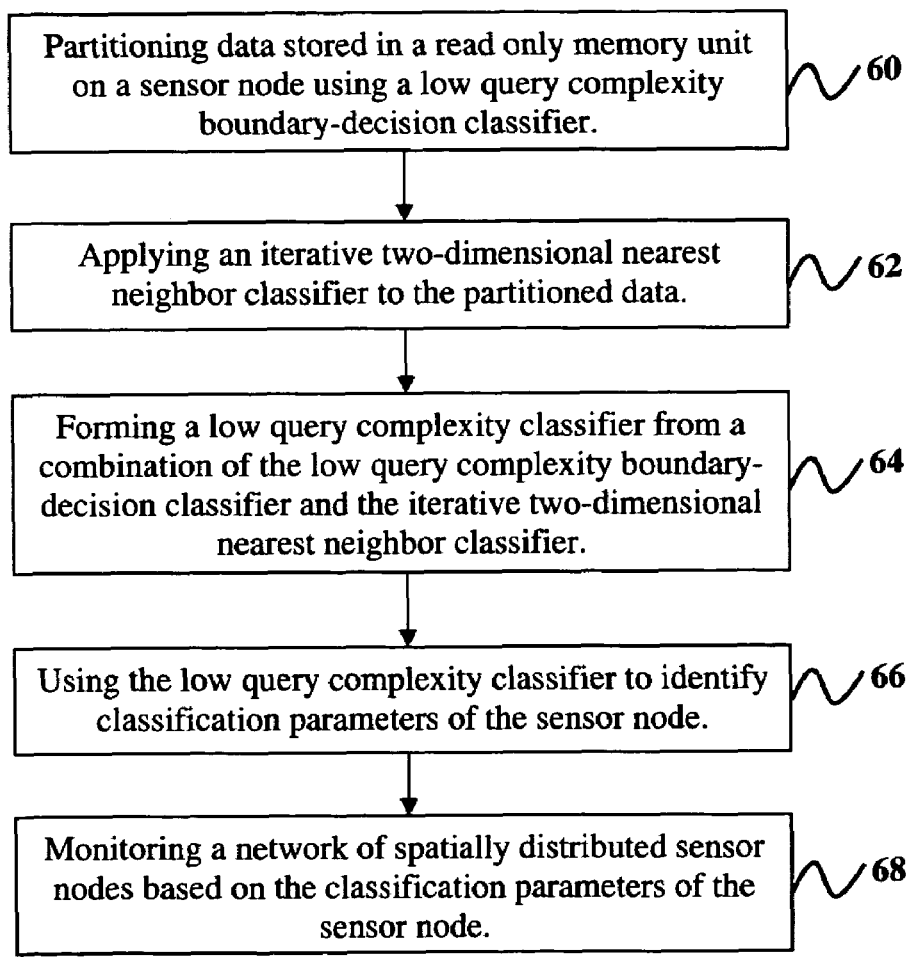
FIG. 6 is a flow diagram illustrating a preferred method of the invention.

A method of multi-modality sensor data classification and fusion according to the invention is illustrated in the flow diagram of FIG. 6, wherein the method comprises partitioning 60 data stored in a read only memory unit on a sensor node using a low query complexity boundary-decision classifier, applying 62 an iterative two-dimensional nearest neighbor classifier to the partitioned data, forming 64 a low query complexity classifier from a combination of the low query complexity boundary-decision classifier and the iterative two-dimensional nearest neighbor classifier, and using 66 the low query complexity classifier to identify classification parameters of the sensor node. The method further comprises monitoring 68 a network of spatially distributed sensor nodes based on the classification parameters of the sensor node. The boundary-decision classifier comprises a single low neuron count hidden layer and a single binary-decision output sensor node, or alternatively, the boundary-decision classifier comprises a linear classifier. Moreover, the network is a wireless unattended ground sensor network, and the data comprises signals transmitted by the sensor node. Furthermore, the classification parameters of the sensor node comprise estimates of a target class for a target located at the sensor node and vector coordinates of the target.

Figure 7:
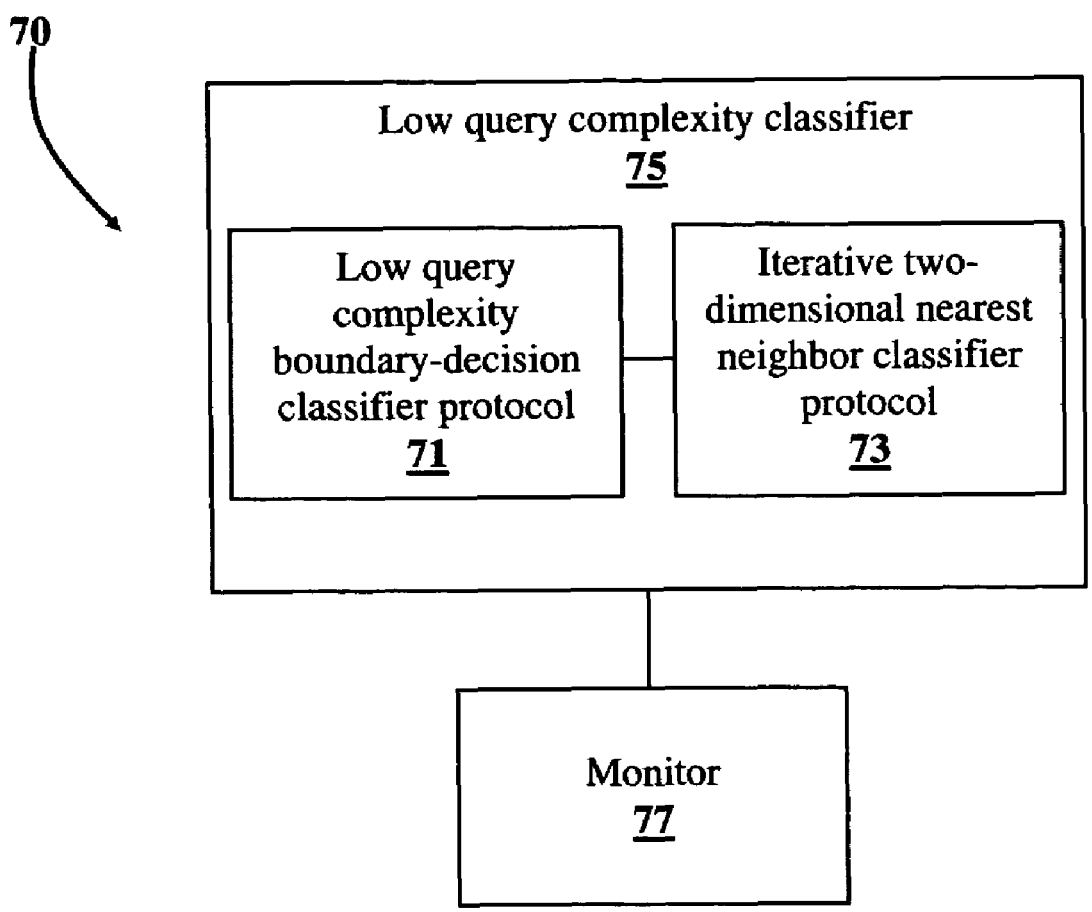
FIG. 7 is a block diagram according to an embodiment of the invention.

In another embodiment illustrated in the block diagram of FIG. 7, the invention provides a system 70 for multi-modality sensor data classification and fusion comprising a low query complexity boundary-decision classifier protocol 71 operable for partitioning data stored in a read only memory unit on a sensor node, an iterative two-dimensional nearest neighbor classifier protocol 73 operable for analyzing the partitioned data, and a low query complexity classifier 75 comprising the combination of the low query complexity boundary-decision classifier and the iterative two-dimensional nearest neighbor classifier, wherein the low query complexity classifier is operable for identifying classification parameters of the sensor node. The system further comprises a monitor 77 operable for monitoring a network of spatially distributed sensor nodes based on the classification parameters of the sensor node.

Figure 8:
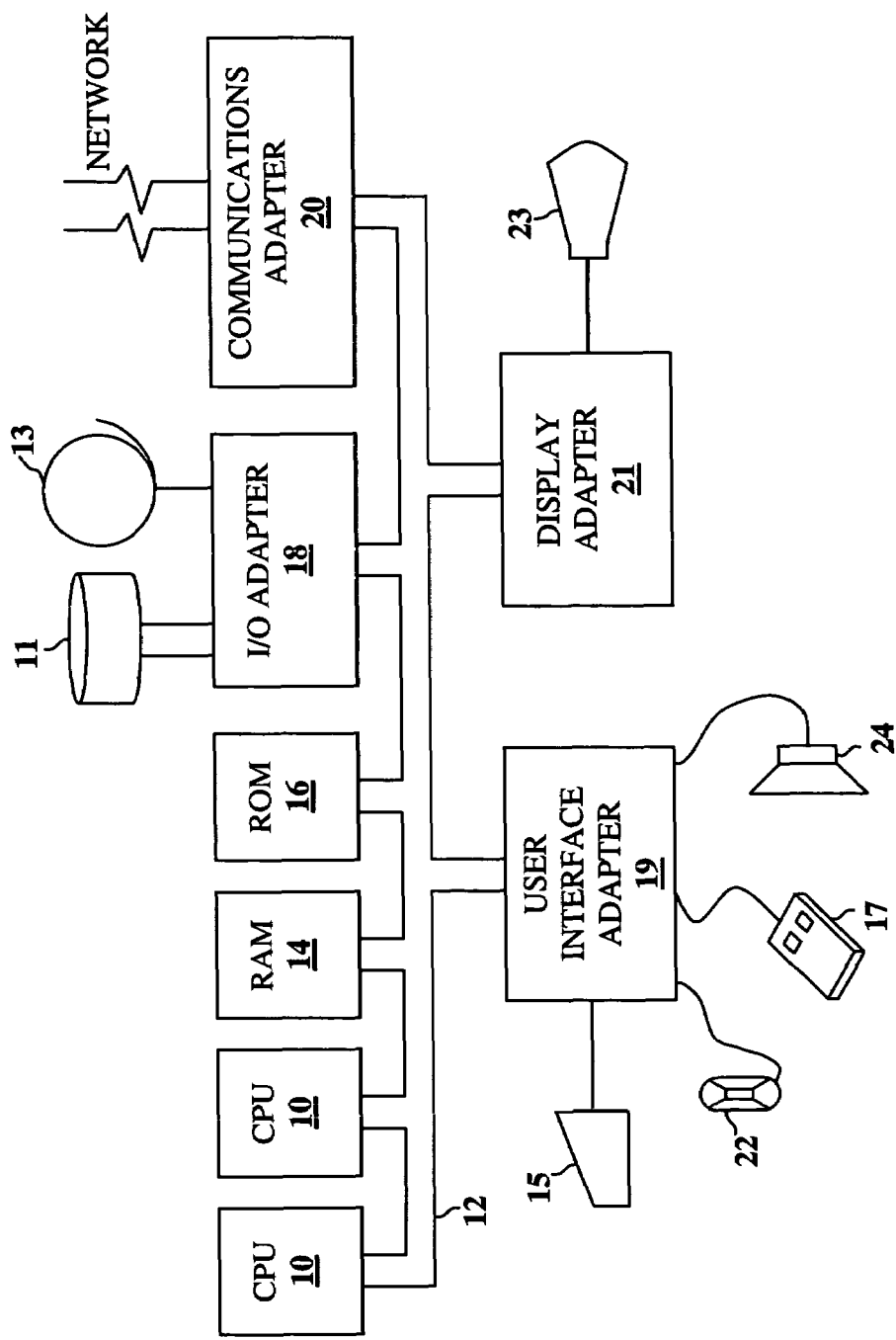
FIG. 8 is a systems diagram according to an embodiment of the invention.

A representative hardware environment for practicing the present invention is depicted in FIG. 8, which illustrates a typical hardware configuration of an information handling/computer system in accordance with the invention, having at least one processor or central processing unit (CPU) 10. The CPUs 10 are interconnected via system bus 12 to random access memory (RAM) 14, read-only memory (ROM) 16, an input/output (I/O) adapter 18 for connecting peripheral devices, such as disk units 11 and tape drives 13, to bus 12, user interface adapter 19 for connecting keyboard 15, mouse 17, speaker 24, microphone 22, and/or other user interface devices such as a touch screen device (not shown) to bus 12, communication adapter 20 for connecting the information handling system to a data processing network, and display adapter 21 for connecting bus 12 to display device 23. A program storage device readable by the disk or tape units is used to load the instructions, which operate the invention, which is loaded onto the computer system.

There are several advantages of the invention. For example, the invention provides low bandwidth exfiltration to the next level for cluster-level or network level classification enhancement. Also, the invention retains use of the vast expertise gained in feature extraction development for certain individual modalities. Additionally, the invention adds to the "toolbox" of conventional classifiers, both for fusion of such classifiers and for greater choice of classifiers to fit to a particular application.

Moreover, as a generic classifier, the invention provides a method of widespread application. It is potentially useful for at least those applications, which require, or are known to benefit from, classification methods. Some examples of such applications include, but are not limited to: automated medical diagnosis; automatic recognition of handwritten letters/digits; database searches (such as word searches or fingerprint searches); image recognition; distinguishing rocks from mines using sonar signals; detection and classification of military targets using distributed sensor networks, among others. The invention is particularly suited to classification problems for which low computational cost per classification is at a premium and/or for which large numbers of features are involved.

The foregoing description of the specific embodiments will so fully reveal the general nature of the invention that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the invention has been described in terms of preferred embodiments, those skilled in the art will recognize that the invention can be practiced with modification within the spirit and scope of the appended claims.

REFERENCES

[1] Wellman, M. C., et al., "Acoustic Feature Extraction for a Neural Network Classifier," ARL Technical Report ARL-TR-1166, Adelphi, Md., 1997.
[2] Wang, L. C., et al., "Automatic Target Recognition Using a Feature-Decomposition and Data-Decomposition Modular Neural Network," IEEE Transactions on Image Processing, Vol. 7, No. 8, pp. 1113-1121, August 1998.
[3] Li, D. et al., "Detection, Classification and Tracking of Targets," IEEE Signal Processing Magazine, pp. 17-29, March 2002.
[4] Hull, D., "Low-Cost Multi-Modal Sensing for Battlefield ISR," B-14, Proc. 2003 Meeting of the MSS Specialty Group on Battlefield Acoustics and Seismic Sensing, Magnetic and Electric Field Sensors, Laurel, Md., October 2003.
[5] Pham, T., et al., "Energy-based Detection and Localization of Stochastic Signals Using an Ad-hoc Sensor Network," Proc. 2002 Meeting of the MSS Specialty Group on Battlefield Acoustic and Seismic Sensing, Magnetic and Electric Field Sensors, Laurel, Md., Sep. 23-26, 2002.
[6] Wang, X., et al., "Collaborative Multi-Modality Target Classification in Distributed Sensor Networks," Proceedings of the Fifth International Conference on Information Fusion, Annapolis, Md., Jul. 8-11, 2002, pp. 285-290.
[7] Kil, D. H., et al., "Pattern Recognition and Prediction with Applications to Signal Characterization," AIP Press, Woodbury, 1996, AIP Series in Modern Acoustics and Signal Processing.
[8] Damarla, T. R., et al., "Army Acoustic Tracking Algorithm," Proc. 2002 Meeting of the MSS Specialty Group on Battlefield Acoustic and Seismic Sensing, Magnetic and Electric Field Sensors, Laurel, Md., Sep. 23-26, 2002.
[9] Kleinberg, J. M., "Two algorithms for nearest-neighbor search in high dimension," Proc. 29th Annual ACM Symposium Theory Computer, pp. 599-608, 1997.
[10] Chan, T., "Approximate nearest neighbor queries revisited," Proc. 13th International Annual Symposium on Computational Geometry (SCG-97), pp. 352-358, New York, Jun. 4-6, 1997, ACM Press.
[11] Vapnik, V. N., "The Nature of Statistical Learning Theory," Springer, New York, 1995.
[12] Mangasarian, O. L., et al., "Lagrangian Support Vector Machine Classification," Data Mining Institute, Computer Sciences Department, University of Wisconsin, Technical Report 00-06, Madison, Wis., June 2000.
[13] Fung, G., et al., "Data Selection for Support Vector Machine Classifiers," Proceedings KDD2000: Knowledge Discovery and Data Mining, Aug. 20-23, 2000, Boston, Mass., pp. 64-70, New York, 2000. Association for Computing Machinery.
[14] Wolfram, S., "The Mathematica Book," Cambridge University Press, New York, fourth edition, 1999.
[15] MATLAB. Using MATLAB. The MathWorks, Inc., Natick, Mass. 01760, 2002.
[16] Blake. C. L., et al., UCI Repository of machine learning databases, Irvine, Calif.: University of California, Department of Information and Computer Science, 1998.
[17] Jain, A. K., et al., "Statistical Pattern Recognition: A Review," IEEE Transactions on Pattern Analysis and Machine Intelligence, Vol. 22, No. 1, pp. 4-37, January 2000.
[18] Monmarche, N., "On Data Clustering with Artificial Ants," Data Mining with Evolutionary Algorithms: Research Directions—Papers from the AAAI Workshop, AAAI Press, Orlando, Fla., pp 23-26.

What is claimed is:

1. A method of multi-modality sensor data classification and fusion in a wireless ground sensor network system consisting of spatially distributed nodes, each node of which containing one or more sensors for detection, tracking and classification of a target object, said method comprising:
partitioning data stored in a read only memory unit on a sensor node using a low query complexity boundary-decision classifier;
applying an iterative two-dimensional nearest neighbor classifier to the partitioned data;
forming a low query complexity classifier from a combination of said low query complexity boundary-decision classifier and said iterative two-dimensional nearest neighbor classifier; and
using said low query complexity classifier to identify classification parameters of said sensor node for detection, tracking and classification of the target.

2. The method of claim 1, wherein said boundary-decision classifier comprises a single low neuron count hidden layer and a single binary-decision output sensor node.

3. The method of claim 1, wherein said boundary-decision classifier comprises a linear classifier.

4. The method of claim 1, further comprising monitoring a network of spatially distributed sensor nodes based on said classification parameters of said sensor node.

5. The method of claim 4, wherein said network is a wireless unattended ground sensor network.

6. The method of claim 1, wherein said data comprises signals transmitted by said sensor node.

7. The method of claim 1, wherein said classification parameters of said sensor node comprise estimates of a target class for a target located at said sensor node.

8. The method of claim 7, wherein said classification parameters of said sensor node comprise vector coordinates of said target.

9. A system for multi-modality sensor data classification and fusion in a wireless ground sensor network system consisting of spatially distributed nodes, each node of which containing one or more sensors connected to a central processing unit (CPU) for target detection, tracking and classification of objects, wherein the CPU is connected to a random access memory (RAM), read only memory (ROM), and input/output (I/O) device for processing the data, comprising:
a low query complexity boundary-decision classifier protocol operable for partitioning data stored in a read only memory unit on a sensor node;
an iterative two-dimensional nearest neighbor classifier protocol operable for analyzing the partitioned data; and
a low query complexity classifier comprising a combination of said low query complexity boundary-decision classifier and said iterative two-dimensional nearest neighbor classifier, wherein said low query complexity classifier is operable for identifying classification parameters of said sensor node.

10. The system of claim 9, wherein said boundary-decision classifier comprises a single low neuron count hidden layer and a single binary-decision output sensor node.

11. The system of claim 9, wherein said boundary-decision classifier comprises a linear classifier.

12. The system of claim 9, further comprising a monitor operable for monitoring a network of spatially distributed sensor nodes based on said classification parameters of said sensor node.

13. The system of claim 12, wherein said network is a wireless unattended ground sensor network.

14. The system of claim 9, wherein said data comprises signals transmitted by said sensor node.

15. The system of claim 9, wherein said classification parameters of said sensor node comprise estimates of a target class for a target located at said sensor node.

16. The system of claim 15, wherein said classification parameters of said sensor node comprise vector coordinates of said target.

17. A system for multi-modality sensor data classification and fusion in a wireless ground sensor network system consisting of spatially distributed nodes, each node of which containing one or more sensors connected to a central processing unit (CPU) for target detection, tracking and classification of objects, wherein the CPU is connected to a random access memory (RAM), read only memory (ROM), and input/output (I/O) device for processing the data, comprising:

means for partitioning data stored in a read only memory unit on a sensor node using a low query complexity boundary-decision classifier;

means for applying an iterative two-dimensional nearest neighbor classifier to the partitioned data;

means for forming a low query complexity classifier from a combination of said low query complexity boundary-decision classifier and said iterative two-dimensional nearest neighbor classifier; and means for using said low query complexity classifier to identify classification parameters of said sensor node.

18. A program storage device readable by computer, tangibly embodying a program of instructions executable by said computer to perform a method of multi-modality sensor data classification and fusion in a wireless ground sensor network system consisting of spatially distributed nodes, each node of which containing one or more sensors connected to a central processing unit (CPU) of the computer for target detection, tracking and classification of objects, wherein the CPU of the computer is connected to a random access memory (RAM), read only memory (ROM), and input/output (I/O) device for processing the data, said method comprising:

partitioning data stored in a read only memory unit on a sensor node using a low query complexity boundary-decision classifier;

applying an iterative two-dimensional nearest neighbor classifier to the partitioned data;

forming a low query complexity classifier from a combination of said low query complexity boundary-decision classifier and said iterative two-dimensional nearest neighbor classifier; and using said low query complexity classifier to identify classification parameters of said sensor node.

19. The program storage device of claim 18, wherein said boundary-decision classifier comprises a single low neuron count hidden layer and a single binary-decision output sensor node.

20. The program storage device of claim 18, wherein said boundary-decision classifier comprises a linear classifier.

21. The program storage device of claim 18, further comprising monitoring a network of spatially distributed sensor nodes based on said classification parameters of said sensor node.

22. The program storage device of claim 21, wherein said network is a wireless unattended ground sensor network.

23. The program storage device of claim 18, wherein said data comprises signals transmitted by said sensor node.

24. The program storage device of claim 18, wherein said classification parameters of said sensor node comprise estimates of a target class for a target located at said sensor node.

25. The program storage device of claim 24, wherein said classification parameters of said sensor node comprise vector coordinates of said target.

* * * * *